United States Patent
Ueda

(10) Patent No.: US 7,512,821 B2
(45) Date of Patent: Mar. 31, 2009

(54) POWER SUPPLY SYSTEM AND METHOD FOR SUPPLYING POWER TO CPU PROVIDING POWER SAVING MODE

(75) Inventor: Tadayoshi Ueda, Hyogo-Ken (JP)

(73) Assignee: Ricoh Company, Ltd., Tokyo (JP)

( * ) Notice: Subject to any disclaimer, the term of this patent is extended or adjusted under 35 U.S.C. 154(b) by 305 days.

(21) Appl. No.: 10/674,397

(22) Filed: Oct. 1, 2003

(65) Prior Publication Data
US 2004/0098632 A1 May 20, 2004

(30) Foreign Application Priority Data
Oct. 2, 2002 (JP) ............................. 2002-289862

(51) Int. Cl.
G06F 1/24 (2006.01)
G06F 1/26 (2006.01)
G06F 1/32 (2006.01)

(52) U.S. Cl. ................... 713/323; 713/100; 713/320; 713/340; 714/23

(58) Field of Classification Search ............ 713/1, 713/2, 100, 300, 310, 320–324, 330, 340, 713/375; 714/23
See application file for complete search history.

(56) References Cited

U.S. PATENT DOCUMENTS

| | | | | | |
|---|---|---|---|---|---|
| 4,590,553 | A | * | 5/1986 | Noda | 713/320 |
| 5,203,000 | A | * | 4/1993 | Folkes et al. | 713/340 |
| 5,237,698 | A | * | 8/1993 | Ohmae | 714/23 |
| 5,481,299 | A | * | 1/1996 | Coffey et al. | 348/173 |
| 5,696,979 | A | * | 12/1997 | Saitou | 713/323 |
| 6,178,516 | B1 | * | 1/2001 | Meade | 713/300 |
| 6,772,356 | B1 | * | 8/2004 | Qureshi et al. | 713/321 |
| 2003/0212916 | A1 | * | 11/2003 | Ito et al. | 713/322 |

FOREIGN PATENT DOCUMENTS

| | | |
|---|---|---|
| JP | 01-143285 | 10/1989 |
| JP | S63-37775 | 10/1989 |
| JP | 03-158911 | 7/1991 |

(Continued)

OTHER PUBLICATIONS

Communication issued by the Japanese Patent Office mailed Aug. 8, 2005 in co-pending Japanese Patent Application No. 2002-289862.

*Primary Examiner*—Thomas Lee
*Assistant Examiner*—Fahmida Rahman
(74) *Attorney, Agent, or Firm*—Dickstein Shapiro LLP

(57) ABSTRACT

A power supply system supplies a power to a CPU with a power saving mode to a mobile information device or terminal. The power supply system includes a power supplying circuit for supplying the CPU with a prescribed supply voltage, a voltage detecting circuit for outputting a reset signal resetting the CPU when the supply voltage decreases to be less than or equal to a prescribed reset level, and a control circuit for decreasing the supply voltage to a prescribed power save level when the power saving mode is set. The control circuit decreases the supply voltage to be the prescribed power save level after decreasing the prescribed reset level to be less than or equal to the power save level when the power saving mode is set. The control circuit recovers the prescribed reset level after recovering the supply voltage when the power saving mode is terminated.

4 Claims, 6 Drawing Sheets

FOREIGN PATENT DOCUMENTS

| | | |
|---|---|---|
| JP | H03-158911 | 7/1991 |
| JP | 06-242845 | 9/1994 |
| JP | H06-242845 | 9/1994 |
| JP | 07-170730 | 7/1995 |
| JP | H07-170730 | 7/1995 |
| JP | 10-337007 | 12/1998 |
| JP | H10-337007 | 12/1998 |

* cited by examiner

POWER SUPPLY SYSTEM AND METHOD FOR SUPPLYING POWER TO CPU PROVIDING POWER SAVING MODE

This application claims priority under 35 USC § 119 to Japanese Patent Application No, 2002-289862 filed on Oct. 2, 2002, the entire contents of which are herein incorporated by reference.

The present specification relates to a power supply system and method for supplying power to a CPU having a power saving mode, and in particular to a power supply system and method for supplying power to a CPU while preventing the CPU from erroneously stopping when operating under a power saving mode.

BACKGROUND OF THE INVENTION

Many mobile information devices such as laptop personal computers, cellular phones, etc., include a power saving mode for the purpose of saving battery power when the devices are in a standby state.

Specifically, in a conventional cellular phone, a battery power supply VBAT, utilizing 3.6 volts is transformed by a regulator 5 into a constant voltage Vcc having 2.0 volts, and is supplied to a CPU 2, which in turn is connected to an operation key 3 and a reception section 4 as shown in FIG. 6. In such a conventional configuration, when the operation key 3 is not activated for more than a prescribed time period, the CPU 2 switches an internal circuit to a low voltage operation condition in order to save power. The CPU 2 simultaneously outputs a voltage switching signal, under a power saving mode, to the regulator 5 so as to decrease a power output from the regulator 5.

The cellular phone is generally driven by a battery power supply VBAT. When an output of the battery power supply VBAT becomes lower than or equal to 2.0 volts, an output of the regulator 5 also becomes lower than or equal to 2.0 volts. Accordingly, a voltage detecting section is generally provided to continuously output reset signals to the CPU 2 so as to deactivate the CPU 2 in order to avoid operation when the output of the regulator 5 becomes less than or equal to a prescribed reference voltage (e.g., 1.9 volts). However, when the CPU 2 of the cellular phone enters into the power saving mode under the above-mentioned procedure, the voltage detecting section also detects such a decreased voltage and outputs a reset signal to the CPU 2. As a result, the CPU 2 is deactivated.

BRIEF SUMMARY OF THE INVENTION

Accordingly, an exemplary embodiment of the present invention provides an improved power supply system for supplying power to a CPU that preferably provides a power saving mode to a mobile information device.

The power supply system under an exemplary embodiment includes a power supplying section that supplies the CPU with a prescribed supply voltage, and a voltage detecting section that outputs a reset signal resetting the CPU when the supply voltage is equal to, or below a prescribed voltage detection value. Furthermore, a control section operates to decrease the supply voltage to a prescribed power-save level when the power saving mode is set. The control section decreases the supply voltage to be less than or equal to the power save level when the power saving mode is set. The control section also recovers the prescribed voltage detection value (or reset level) after recovering the supply voltage when the power saving mode is terminated.

In another exemplary embodiment, a power supplying section switches the power supply voltage from a first to a second level that is lower than a first level, using a first switching signal. The power supplying section also changes the first switching signal from a first to a second condition when a power saving mode is set. A voltage detecting section changes the voltage detection value (or reset level) from a first to a second level, where the second level is lower than the first level, by using a second switching signal. The voltage detection section also changes the second switching signal from a first to a second condition when the power saving mode is set. The control section then changes the second switching signal from a first to a second condition after changing the first switching signal from a first to a second condition.

In yet another exemplary embodiment, the control section returns the second switching signal to the second level after returning the first switching signal to the first condition when the power saving mode is terminated.

BRIEF DESCRIPTION OF THE DRAWINGS

The present disclosure and features and advantages thereof will be more readily apparent from the following detailed description and appended claims when taken with drawings, wherein:

DETAILED DESCRIPTION OF THE INVENTION

Figure 1:
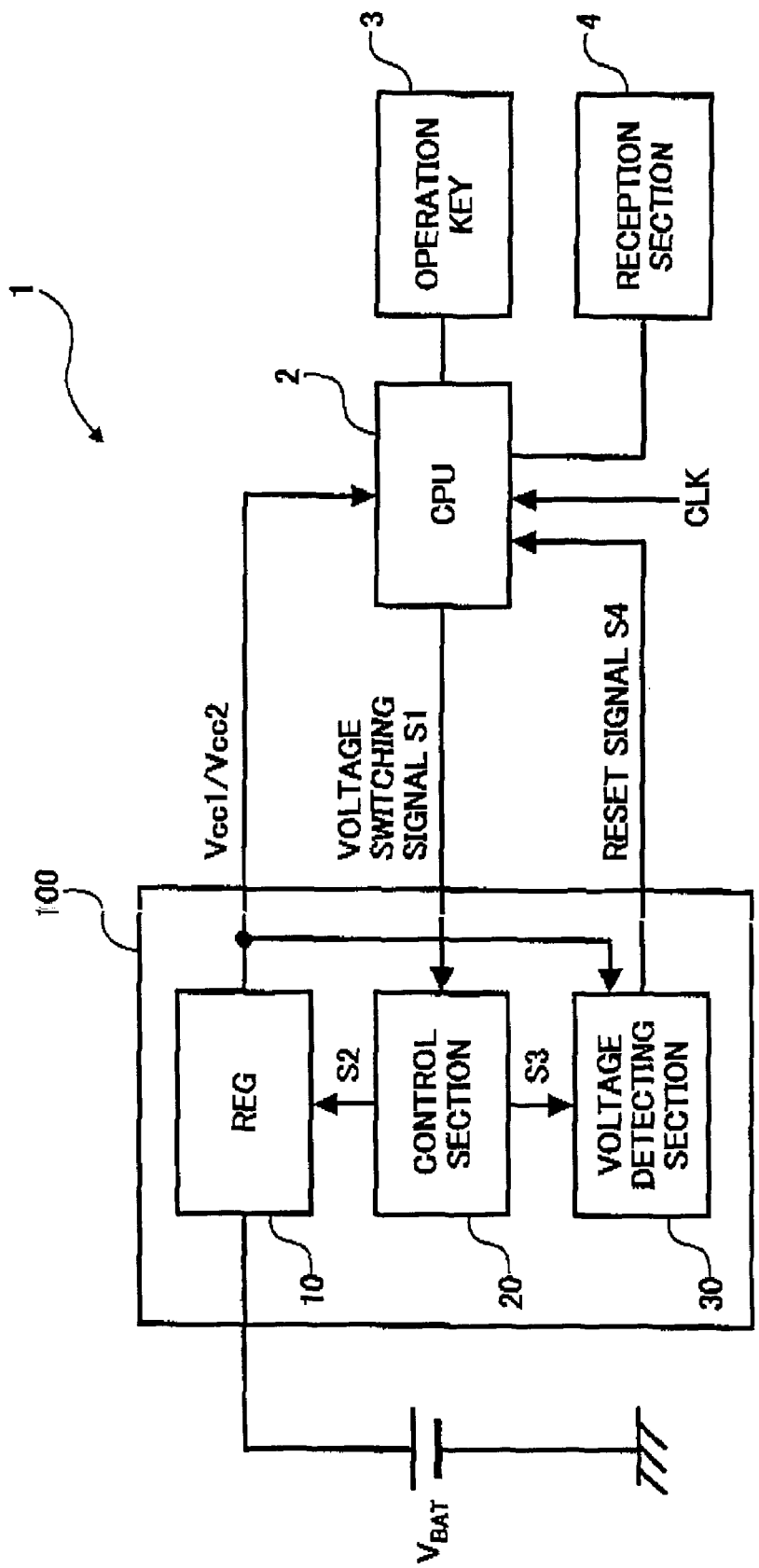
FIG. 1 illustrates an exemplary cellular phone employing a CPU providing a power saving mode according to a first embodiment.

Referring now to the drawings, wherein like reference numerals and marks designate identical or corresponding parts throughout several views, in particular in FIG. 1, a cellular phone 1 is described under a first exemplary embodiment. Cellular phone 1 includes a power supply control section 100 that adjusts an output of a battery power supply VBAT, a CPU 2, an operational key 3, and a reception section 4. The CPU 2 provides a power saving mode and outputs a voltage switching signal SI of a low level to the power supply control section 100 during a power saving mode. The CPU 2 also outputs a voltage switching signal SI of a high level to the power supply control section 100 during a normal operation mode.

The power supply control section 100 includes a regulator 10, a control section 20, and a voltage detecting section 30. Exemplary configurations and operations of these devices are now described.

The regulator 10 ordinarily outputs a constant voltage Vcc1 of 2.0 volts by transforming a battery power supply VBAT, having an initial output of 3.6 volts. The regulator 10 also outputs a constant voltage Vcc2 that is lower than voltage Vcc1 in response to a low level REG switching signal S2, which is transmitted from the control section 20. Under this configuration, the regulator 10 serves as a power supply section, supplying the CPU 2 with power in collaboration with the battery power supply VBAT.

The voltage detecting section 30 outputs a reset signal S4 to the CPU 2 when an output voltage Vcc (e.g. Vcc1 or Vcc2) output by the regulator 10 becomes less than a later mentioned prescribed voltage detection value, set in the voltage detecting section 30. A prescribed voltage detection value may be derived from (Vref×((r5)/(r4+r5))) or (Vref×((r4+r5)/(r4+r5+r6))).

The control section 20 decreases the prescribed voltage detection value from the first to second level in response to a low level voltage switching signal SI when a power saving mode is set (i.e., when Vcc2 is larger than the second level, and the first level is larger than the Vcc2). The first and second levels correspond to the voltage reference detection values (Vref×((r4+r5)/(r4+r5+r6))) and (Vref×((r5)/(r4+r54), respectively. Subsequently, the control section 20 decreases voltage Vcc, output from the regulator 10, down to Vcc2 from Vcc1. Further, when the low level voltage switching signal SI is stopped for the purpose of terminating the power saving mode, the control section 20 synchronously controls the regulator 10 to recover the output voltage Vcc1, and after that controls the voltage detecting section 30 to recover the first voltage level.

The regulator 10, control section 20, and voltage detecting section 30 are now described in more detail with reference to FIG. 2.

Figure 2:
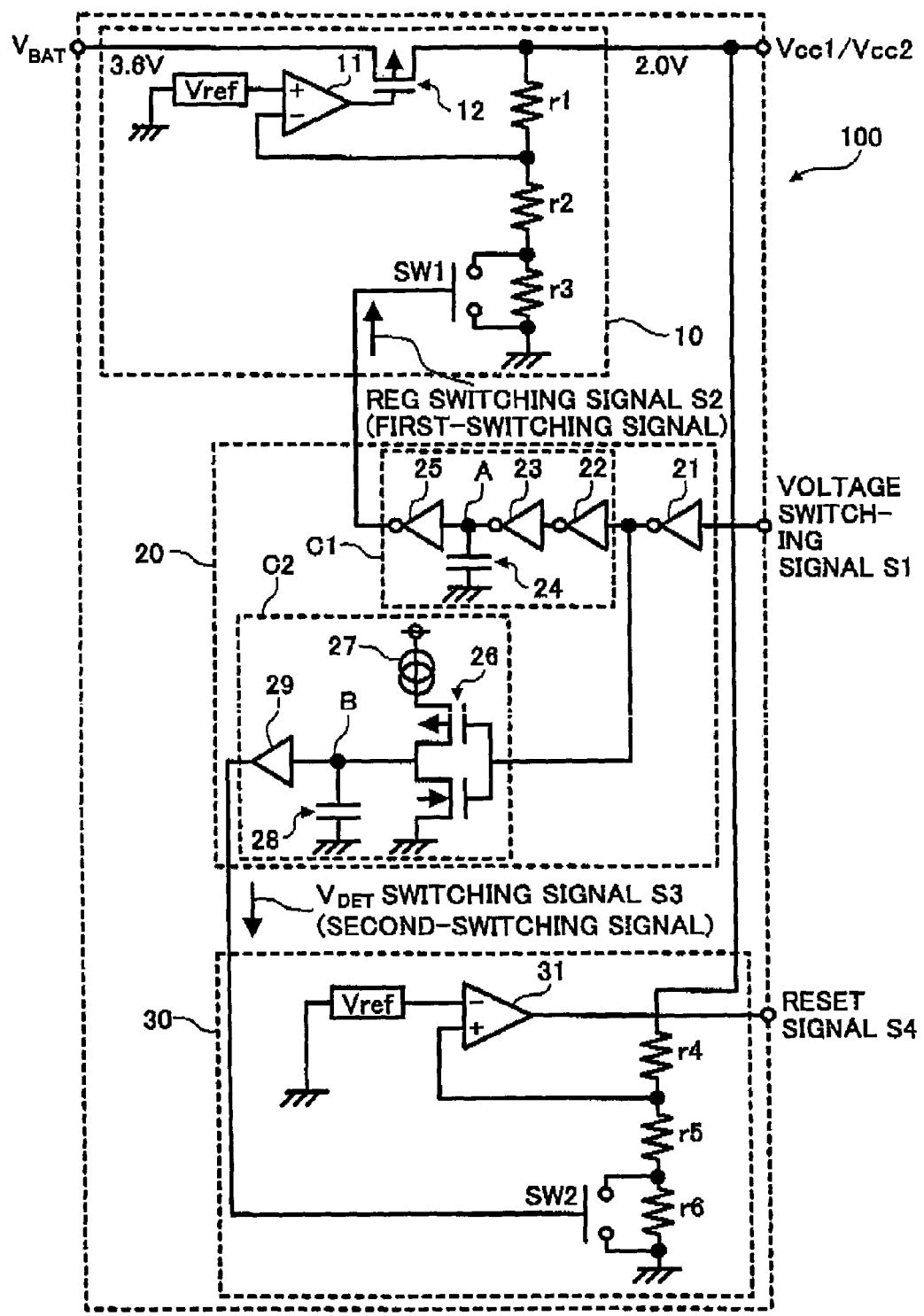
FIG. 2 illustrates a power supply control section used in FIG. 1.

The regulator 10 of FIG. 2 outputs a constant voltage Vcc1 of 2.0 volts from the battery power supply VBAT, and has an initial output value of 3.6 volts as mentioned above. The regulator 10 includes a P-channel type MOSFET 12 generating an output based upon the output from the battery power supply VBAT in accordance with a voltage applied to its gate terminal as a control signal from comparator 11. A reference voltage "Vref" generated by a regulator (not shown) is input to a positive input terminal of the comparator 11. A signal obtained by dividing an output of the MOSFET 12 with a resistance division circuit formed from resistances r1 to r3 is input to a negative input terminal of the comparator 11. A switch SW1 is turned OFF by an input of a REG switching signal S2 (a first switching signal) of a high level.

The voltage detecting section 30 includes comparator 31. A value obtained by dividing Vcc1 of 2.0 volts of the regulator 10 with a resistance division circuit formed from resistances r4 to r6. The value is then applied to a positive input terminal of the comparator 31. A reference voltage Vref generated by a regulator (not shown) is input to the negative input terminal of comparator 31. Switch SW2 is turned OFF by a high-level input of a VDET switching signal S3 (a second switching signal).

The control section 20 includes a plurality of signal generating circuits C1 and C2, each of which respectively generate a REG switching signal S2 and a VDET switching signal S3. Signal generating circuits C1 and C2 each branch off from an inverter 21 to which a voltage switching signal SI is input from the CPU 2. The voltage switching signal SI is input to the signal generation circuits C1 and C2 via the inverter 21.

The signal generation circuit C1 includes three inverters 22, 23, and 25, which are serially connected as shown in FIG. 2. A condenser 24 is disposed between the inverters 23 and 25, and is grounded at one end. The signal generation circuit C2 includes a CMOS inverter 26, driven by a constant current source 27, a condenser 28, and a buffer circuit 29.

Figure 3:
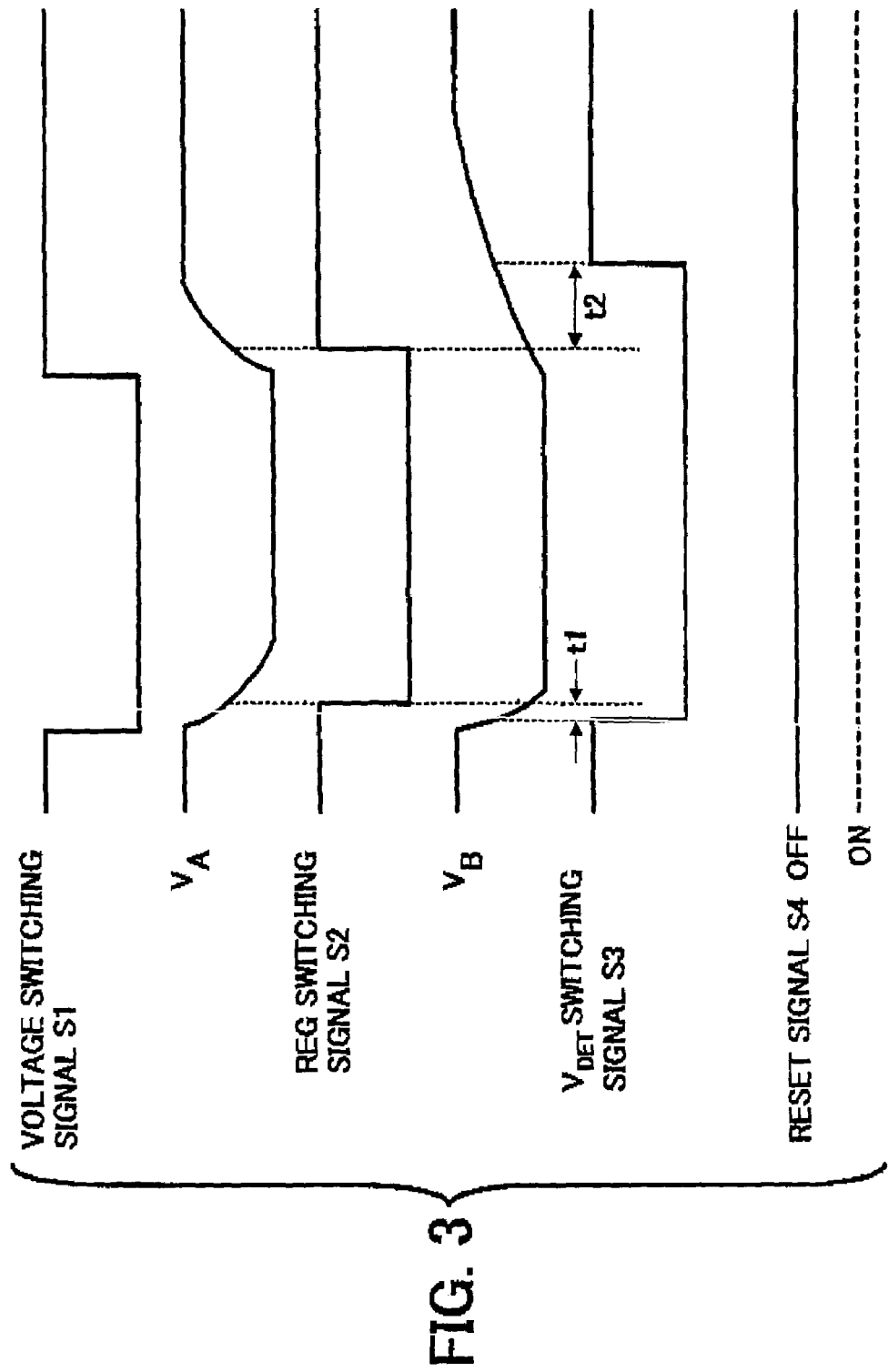
FIG. 3 illustrates exemplary signals and their waveforms output from the power supply control section.

Respective waveforms of the voltage switching signal SI output from the CPU 2 to the control section 20, a voltage VA appearing at a position "A" in the signal generation circuit C1, the REG switching signal S2, a voltage VB appearing at a position "B" in the signal generation circuit C2, the VDET switching signal S3, and a reset signal S4 output from the voltage detecting section 30 are described with reference to the control section 20 and FIGS. 2 and 3.

The condenser 24 preferably has a larger capacity than the condenser 28, so that the voltage VA can more gently decrease than the voltage VB at a time of a falling edge of the voltage switching signal SI. By employing such a configuration, the VDET switching signal S3 initially drops to a low level on a falling edge as shown in FIG. 3. After a period of time t1 has elapsed, the REG switching signal S2 also falls down as illustrated in FIG. 3.

Further, the voltage appearing at the position "A" (FIG. 2) rises up at a time of a rising edge of the voltage switching signal SI at the same speed at which it drops. At the position "B" (FIG. 2), however, the voltage gently rises up due to a function of the constant current source 27. Accordingly, the REG switching signal S2 initially rises up when the voltage switching signal SI rises up. Then, when a time t2 has elapsed, the VDET switching signal S3 rises up as illustrated in FIG. 3.

By employing such a configuration, an erroneous output of a reset signal (e.g. ON) to the CPU 2 can be avoided. The erroneous reset signal is typically generated when either the constant voltage output Vcc descends from Vcc1 to Vcc2 (that is lower than Vref1) before a voltage detection value defined by the voltage detection section 30 descends to the second level (i.e., v2=Vref×(r5)/(r4+r5)) from the first level (i.e., v1=Vref×(r4+r5)/(r4+r5+r6)), or when the voltage detection value recovers the first level from the second level before the constant voltage Vcc recovers the output voltage Vcc1 from the Vcc2.

Figure 4:
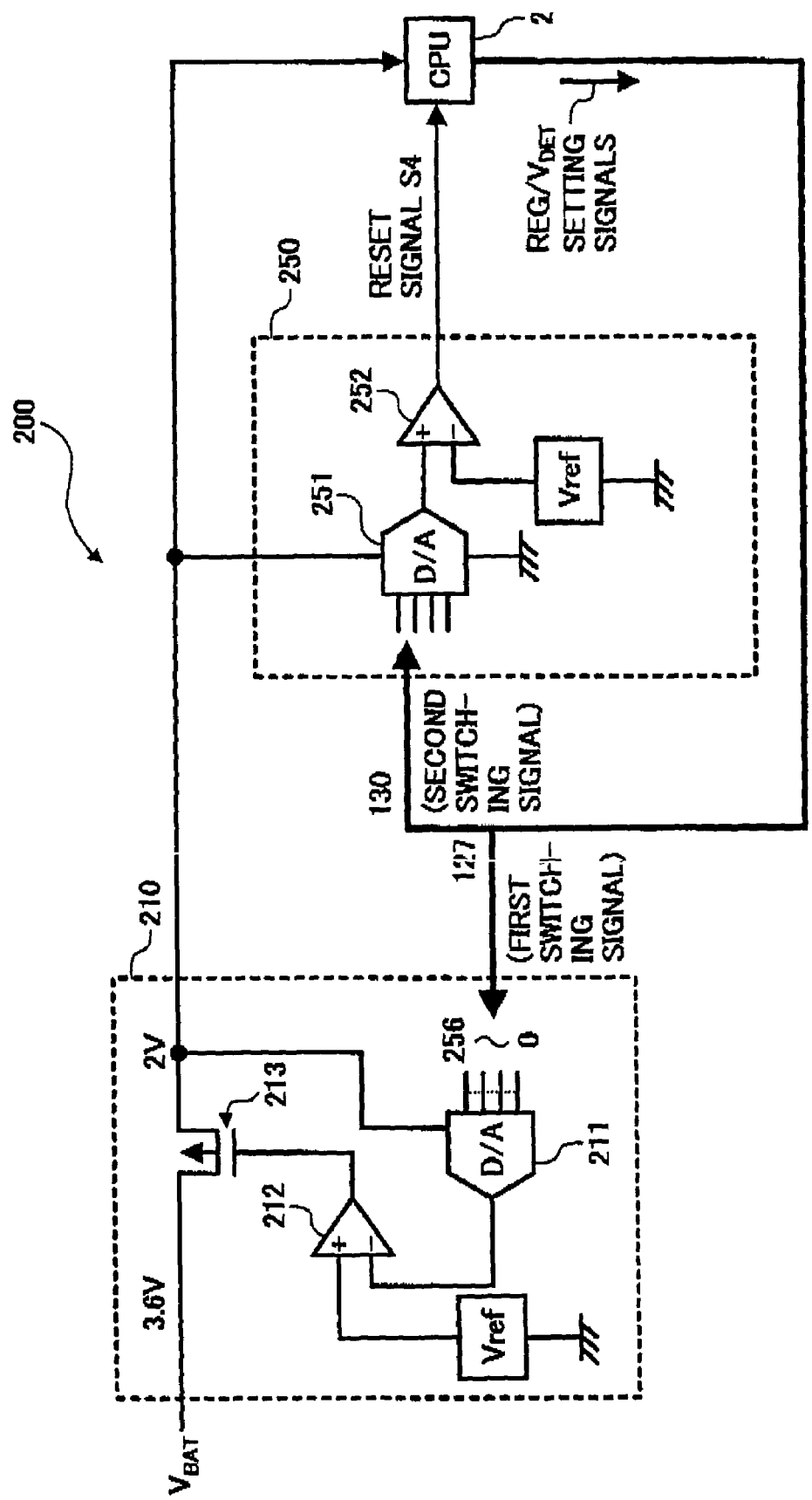
FIG. 4 illustrates another exemplary cellular phone employing a CPU providing a power saving mode.

A second embodiment is now described with reference to FIG. 4. As shown, the illustrated embodiment includes a power supply control section 200 that emulates the power supply control section 100 of the first embodiment by partially utilizing a function of the CPU 2.

Specifically, a regulator 210 includes a P-channel type MOSFET 213 that adjusts its output in accordance with a voltage applied to its gate as a control signal in the similar manner as performed by the regulator 10 of the first embodiment. Regulator 210 includes a comparator 212 that outputs electric signals to the gate of the MOSFET 213. A reference voltage Vref provided by a regulator (not shown) is applied to a positive input terminal of the comparator 212. A D/A converter 211 is connected to a negative input terminal of a comparator 212 so as to output analog signals Vcc1 from 2.0 to 0 volts, based upon the output from the FET 213 in accordance with digital signals 0 to 256. The CPU 2 outputs a REG setting signal (a first switching signal) of 127 values (decimal expression) to the D/A converter 211 when an operation mode runs with the ordinary voltage.

A voltage detecting section 250 includes a D/A converter 251 that outputs analog signals Vcc1 from 2.0 to 0 volts based upon the output from the FET 213 in accordance with digital signals of from 0 to 256. A comparator 252 receives analog signals from the D/A converter 251 at its positive input terminal, and receives an input of a reference voltage vref generated by a regulator (not shown) at its negative input terminal. An output of the comparator 252 serves as a reset signal S4 for resetting the CPU 2. When an operation mode runs with normal operating voltage, the CPU 2 outputs a VDET setting signal (a second switching signal) of 130 values to the D/A converter 251.

Figure 5:
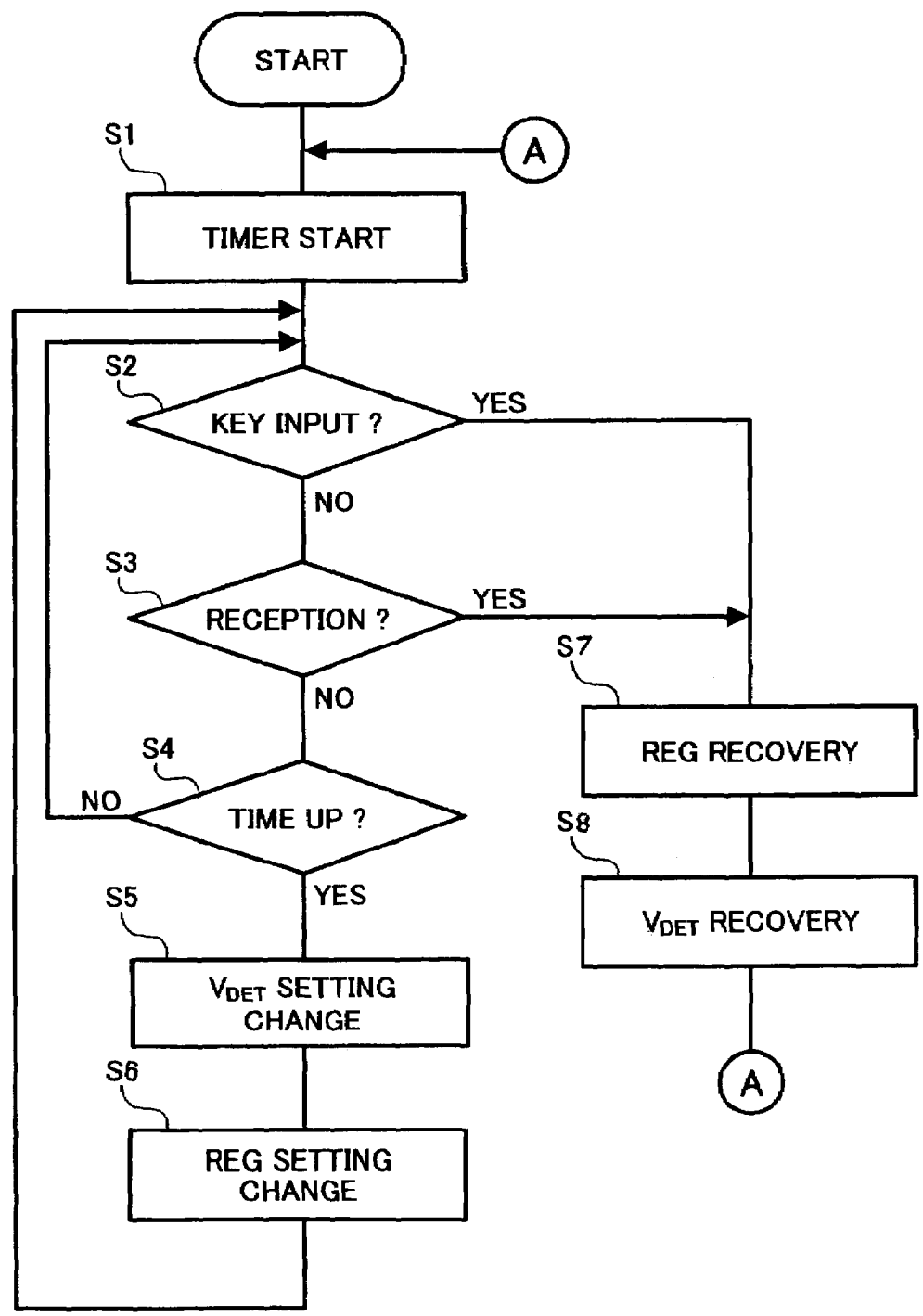
FIG. 5 illustrates a procedure executed by the CPU illustrated in FIG. 4.
Figure 6:
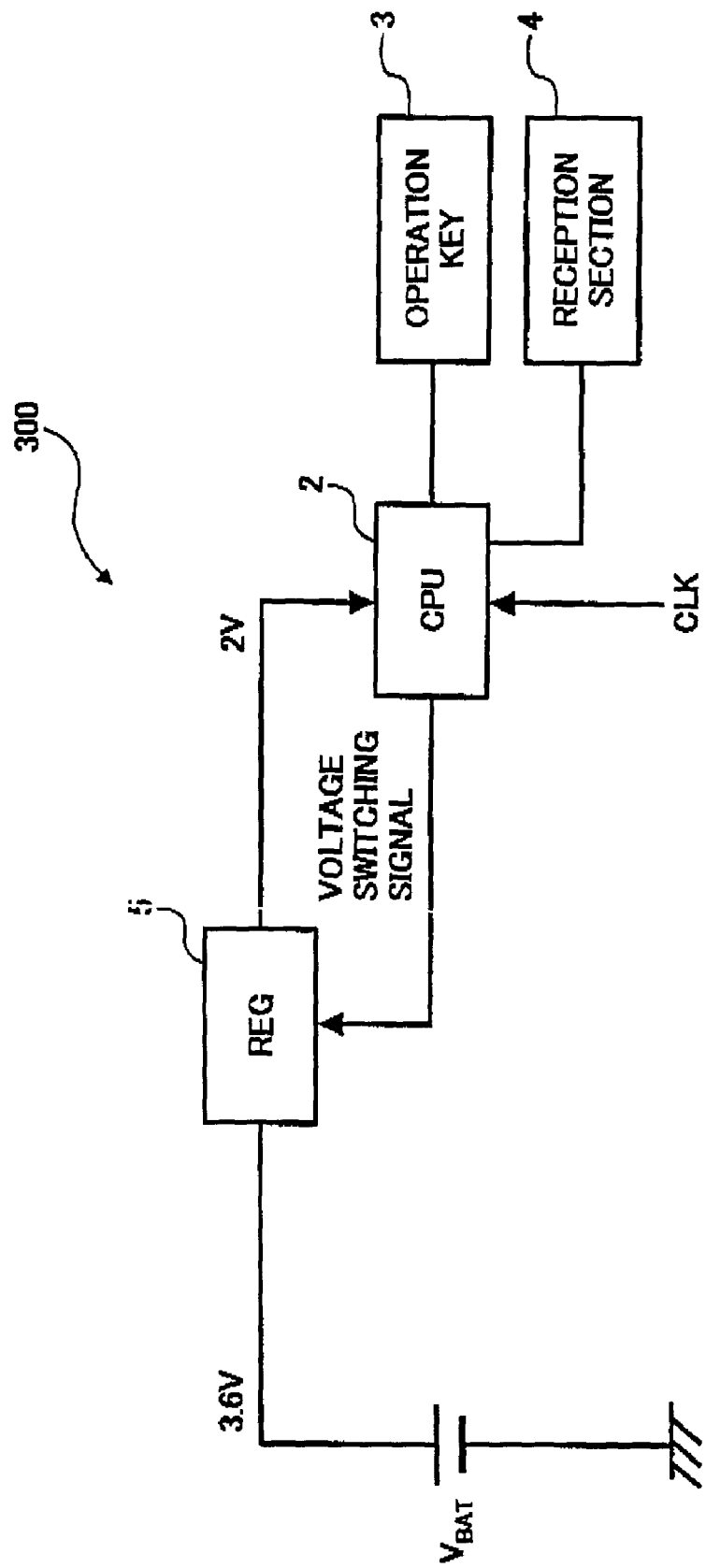
FIG. 6 illustrates a conventional cellular phone.

An operation of the second embodiment, which is controlled by the CPU 2, is now described with reference to FIG. 5. First, a timer is initiated in step S1. When none of key inputs and signal receptions exists ("No", in steps S2 and S3) and the timer times out ("Yes", in step S4), the VDET switching signal is changed from 130 down to 50 values so that a voltage detection value set in the voltage detecting section 250 decreases in order to prevent the detecting section 250 from outputting a reset signal S4 to the CPU 2 (step S5). Then, the REG setting signal is changed from 127 down to 48 values, so that the output value Vcc of the regulator 210 is decreased (step S6).

When the CPU 2 detects any one of the key inputs and signal receptions ("Yes", in steps S2 or S3), the CPU 2, operating in the power saving mode, initially returns the value of the REG setting signal from 48 up to 127 values, and thereby recovers the output voltage Vcc and the normal operation mode (step S7). The CPU 2 then changes the VDET setting signal from 50 back to 130 values in order to prevent the voltage detecting section 250 from outputting the reset signal S4 to the CPU 2 (step S8). Since such recoveries are performed only by changing values of REG and VDET setting signals, it is not a particular burden on the CPU 2, and can be employed even during the power saving mode. After that, the process returns to step S1 to start the timer again.

Numerous additional modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States is:

1. A power supply system for supplying power to a CPU, said power supply system comprising:
   a power supply circuit for supplying the CPU with a prescribed supply voltage;
   a voltage detecting circuit for outputting a reset signal for resetting the CPU when the supply voltage is at or below a prescribed voltage detection value;
   a control circuit for decreasing the supply voltage to a prescribed power save voltage level when a power saving mode is set,
   wherein said control circuit decreases the supply voltage to be the prescribed power save voltage level after decreasing the prescribed voltage detection value to be less than or equal to the power save voltage level when the power saving mode is set such that the reset signal is not output when the power saving mode is being set, and
   wherein said control circuit recovers the prescribed voltage detection value after recovering the supply voltage when the power saving mode is terminated.

2. The power supply system according to claim 1, wherein said power supply circuit switches the power supply voltage from a first power level to a second power level using a first switching signal, said second power level being lower than said first power level,
   said control circuit changing the first switching signal from a first to a second condition, and said voltage detecting circuit changing a reset level from a first reset level to a second reset level by using a second switching signal, said second reset level being lower than said first reset level; and
   said control circuit changing the second switching signal from a third condition to a fourth condition,
   wherein said control circuit changes the second switching signal from the third condition to the fourth condition before changing the first switching signal from the first to the second condition when the power saving mode is set,
   wherein said control circuit returns the second switching signal to the third condition after returning the first switching signal to the first condition when the power saving mode is terminated.

3. The power supply system according to claim 2, wherein said power supply circuit includes:
   a transistor configured to pass an output voltage of a battery power source in accordance with a control voltage applying thereto;
   an amplifier configured to output the control voltage, said control voltage being determined from a difference between a prescribed rate portion of the output voltage and a prescribed reference voltage, said prescribed rate portion being input to the amplifier;
   a voltage decreasing device for changing the prescribed rate portion and for decreasing the output voltage in response to an input of the first switching signal in the second condition;
   wherein said voltage detecting circuit includes:
   a comparator configured to output the reset signal for resetting the CPU when a second prescribed rate portion of the output voltage of the power supply circuit is less than or equal to a prescribed reference value; and
   a voltage detection value changing device for changing the second prescribed rate portion in response to an input of the second switching signal in the fourth condition transmitted from the control circuit;
   wherein said control circuit outputs the second switching signal in the fourth condition to the power supplying circuit before outputting the first switching signal in the second condition to the voltage detecting circuit when the CPU sets the power saving mode; and said control circuit outputs the first switching signal in the first condition to the voltage detecting circuit before outputting the second switching signal in the third condition to the power supply circuit when the CPU resets the power saving mode.

4. A method for supplying power to a CPU providing a power saving mode, said method comprising the steps of:
   providing a reset signal for resetting the CPU when an output voltage from a power supply is less than or equal to a prescribed voltage detection value;
   setting the power saving mode;
   decreasing the output voltage to be a power saving level after decreasing the prescribed voltage detection value to be less than or equal to the power saving level when the power saving mode is set such that the reset signal is not output when the power saving mode is being set;
   resetting the power saving mode; and
   recovering the prescribed voltage detection value after recovering the output voltage.

* * * * *